2,717,234
Patented Sept. 6, 1955

2,717,234

METHOD OF PREPARING K₂UF₆ FOR FUSED BATH ELECTROLYSIS

Rudolph Nagy, Bloomfield, and John W. Marden, East Orange, N. J., assignors to the United States of America as represented by the United States Atomic Energy Commission No Drawing. Application March 6, 1943,
Serial No. 478,271

11 Claims. (Cl. 204—10)

This invention relates to the manufacture of uranium salt and more particularly to the production of di-potassium uranous fluoride which has the formula $K_2UF_6$.

Heretofore, several methods have been devised for the preparation of uranium metal. Most of these methods have been directed to the production of the metal by reducing compounds of extreme activity, which methods have proved relatively expensive to carry out commercially.

In addition, the presence of deleterious substances in such compounds affected the working of such compounds in the powdered state. The present method relates to production of a cheaper and more efficient compound of uranium from which the metal of high purity may be made by several known methods.

The principal object of our invention is the production of an oxygen-free halide salt of uranium containing no undesirable impurities.

Another object is to produce a uranium salt that can be electrolyzed to produce uranium metal of high purity on a commercial scale.

A further object is the production of a ready source of halides of tetravalent uranium.

Other objects and advantages of the invention and its particular uses in processes of manufacturing high purity uranium will be evident from the following disclosure.

In accordance with the present invention we have been able to produce di-potassium uranous fluoride ($K_2UF_6$) by reaction of uranous oxide ($UO_2$) with potassium acid fluoride ($KHF_2$) at an elevated temperature sufficient to form the di-potassium uranous fluoride, generally in molten state. $UO_2$ used in this operation preferably is prepared by reduction of a higher oxide of uranium such as $U_3O_8$ with hydrogen preferably at a temperature of about 600° C. to produce the desired uranous oxide, $UO_2$. The uranous oxide is then heated with potassium acid fluoride, $KHF_2$, to about 800° C. to produce di-potassium uranous fluoride, $K_2UF_6$, according to the following equation:

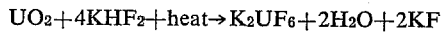

$$UO_2 + 4KHF_2 + \text{heat} \rightarrow K_2UF_6 + 2H_2O + 2KF$$

The potassium fluoride formed may be re-used if desired to prevent loss thereof as a by-product in the principal reaction. Thus, the potassium fluoride formed may be treated with fifty percent hydrofluoric acid to produce hydrated potassium acid fluoride according to the probable equation:

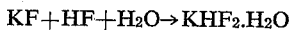

$$KF + HF + H_2O \rightarrow KHF_2 \cdot H_2O$$

The resulting product is then re-used in the process to produce the desired di-potassium uranous fluoride. The water of hydration may or may not be removed before heating with the uranous oxide.

In preparing the di-potassium uranous fluoride by our present method, for every four (4) mols of potassium acid fluoride one (1) mol of uranous oxide is added and the mixture heated in a carbon, graphite or other non-reactant crucible to a temperature of about 800° C. In order to secure uniform temperature of the mixture, heater coils around the crucible have proven very effective.

When the reaction has gone to completion the heavy di-potassium uranous fluoride settles to the bottom of the vessel and the potassium fluoride is decanted or syphoned off for reuse as before described. The molten salt is dipped or poured out of the crucible, cooled, ground and extracted with water from the balance of the potassium fluoride and any other impurities removable by water, as by agitation in a barrel or stirring in a vat. Finally, the di-potassium uranous fluoride is worked into a Buchner funnel and dried at about 100° C.

The tetravalent uranium salt is then ready for electrolysis and working into a uranium powder in a manner similar to the treatment of potassium uranous fluoride $KUF_5$ or uranium tetrafluoride $UF_4$ described in the patents to Driggs et al., U. S. 1,821,176 and Driggs et al., U. S. 1,861,625, that is, by electrolysis from an electrolyte containing $K_2UF_6$ and a material selected from the group consisting of alkali metal and alkaline earth metal halides.

The uranium produced from di-potassium uranous fluoride is in every way comparable in purity and texture with that produced from potassium uranous fluoride and uranium tetrafluoride.

The process is thus of great value when halides of tetravalent uranium of requisite chemical purity are not available commercially.

It is appreciated that the quantities and ratios of the constituents as well as the temperature of the reaction bath used in producing di-potassium uranous fluoride, $K_2UF_6$, may vary within limits of our invention, and it is to be understood that those given and described are merely illustrative and limited solely by the scope of the appended claims.

We claim:

1. The method of producing di-potassium uranous fluoride ($K_2UF_6$) which comprises heating uranous oxide with potassium acid fluoride at an elevated temperature.

2. The method of producing di-potassium uranous fluoride ($K_2UF_6$) which comprises heating uranous oxide with potassium acid fluoride at a temperature of about 800° C.

3. A method of preparing di-potassium uranous fluoride ($K_2UF_6$) which comprises reacting potassium acid fluoride with uranous oxide to form a first portion of di-potassium uranous fluoride and potassium fluoride, separating the potassium fluoride, adding hydrofluoric acid thereto to form additional potassium acid fluoride, and reacting the resulting potassium acid fluoride with additional uranous oxide to form a further portion of the di-potassium uranous fluoride.

4. A method which comprises reacting potassium acid fluoride with uranous oxide to form di-potassium uranous fluoride ($K_2UF_6$) and potassium fluoride, at a temperature sufficiently high to form said di-potassium uranous fluoride in molten state, permitting the fluorides to stratify and separating the two fluorides.

5. The method of claim 1 wherein the reaction is conducted at a temperature sufficiently high to form the di-potassium uranous fluoride in molten state.

6. The process which comprises reacting uranous oxide with potassium acid fluoride at elevated temperature to form potassium fluoride and di-potassium uranous fluoride ($K_2UF_6$), separating potassium fluoride from the reaction mixture, and subjecting the remaining reaction mixture containing the di-potassium uranous fluoride to cooling, grinding and extraction with water.

7. The method recited in claim 3 wherein the reactions between uranous oxide and potassium acid fluoride are carried out at about 800° C. and wherein the separated di-potassium uranous fluoride (K₂UF₆) formed is cooled, dried, ground and extracted with water.

8. A fusible electrolyte comprising as its essential ingredient K₂UF₆ and containing a material selected from the group consisting of alkali metal and alkaline earth metal halides.

9. The method of producing di-potassium uranous fluoride (K₂UF₆) and potassium fluoride which comprises heating uranous oxide with potassium acid fluoride to a temperature sufficiently high to form the di-potassium uranous fluoride in the molten state, separating the fluorides, and further purifying the di-potassium uranous fluoride.

10. The method recited in claim 9 wherein the last-mentioned purification step includes washing with water.

11. The method recited in claim 9 wherein the last-mentioned purification step includes washing with water and subsequent drying at elevated temperatures.

References Cited in the file of this patent

UNITED STATES PATENTS 2,167,762    Lockwood _____ Aug. 1, 1939

OTHER REFERENCES

Thorpe, Dictionary of Applied Chemistry, vol. 5, page 588 (1916), published by Longmans, Green and Co., London.

Pierle, Journal of Physical Chemistry, vol. 23, page 527 (1919).

Mellor, "Comprehensive Treatise on Inorganic and Theoretical Chemistry," vol. XII, 1932, pages 45, 74, 83; and vol. II, 1922, page 516.

Uranium and Atomic Powers, Dement et al., 1941, page 122, Chemical Publishing Company, Brooklyn, N. Y.